United States Patent
Driscoll et al.

(10) Patent No.: US 7,765,795 B2
(45) Date of Patent: Aug. 3, 2010

(54) NOX CONTROL USING A NEURAL NETWORK

(75) Inventors: James J. Driscoll, Dunlap, IL (US); Mary L. Kesse, Peoria, IL (US); Wade J. Robel, Peoria, IL (US); Amit Jayachandran, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 1132 days.

(21) Appl. No.: 11/415,504

(22) Filed: Apr. 28, 2006

(65) Prior Publication Data

US 2007/0251218 A1 Nov. 1, 2007

(51) Int. Cl.
*F01N 3/00* (2006.01)

(52) U.S. Cl. .............................. 60/285; 60/295; 60/301; 60/313; 60/287

(58) Field of Classification Search .................... 60/286, 60/295, 301, 276, 274
See application file for complete search history.

(56) References Cited

U.S. PATENT DOCUMENTS

| 5,539,638 | A | | 7/1996 | Keeler et al. |
| 5,682,317 | A | | 10/1997 | Keeler et al. |
| 6,047,542 | A | * | 4/2000 | Kinugasa et al. ............. 60/274 |
| 6,882,929 | B2 | | 4/2005 | Liang et al. |
| 2001/0014436 | A1 | | 8/2001 | Lemelson et al. |
| 2003/0018399 | A1 | | 1/2003 | Havener et al. |
| 2003/0217021 | A1 | | 11/2003 | Jacobson |
| 2004/0063210 | A1 | | 4/2004 | Steichen et al. |
| 2004/0126286 | A1 | | 7/2004 | deRuyter |
| 2004/0249578 | A1 | | 12/2004 | Ammouri et al. |
| 2005/0282285 | A1 | * | 12/2005 | Radhamohan et al. ......... 436/55 |
| 2006/0096275 | A1 | * | 5/2006 | Robel et al. ................... 60/286 |
| 2007/0092426 | A1 | * | 4/2007 | Driscoll et al. .............. 423/352 |
| 2007/0137182 | A1 | | 6/2007 | Driscoll |

OTHER PUBLICATIONS

Thompson et al., "Neural Network Modelling of the Emissions and Performance of a Heavy-Duty Diesel Engine," Proc. Instn. Mech. Engs., 214:111-126 2000.
Traver et al., "A Neural Network-Based Virtual $NO_x$ Sensor for Diesel Engines," http://www.atkinsonllc.com/WhitePapers.html 1999.
Traver et al., "Neural Network-Based Diesel Engine Emissions Prediction Using In-Cylinder Combustion Pressure," SAE Technical Paper Series, 1999-01-1532, pp. 1-15 1999.

* cited by examiner

*Primary Examiner*—Thomas E Denion
*Assistant Examiner*—Jesse Bogue
(74) *Attorney, Agent, or Firm*—Finnegan, Henderson, Farabow, Garrett & Dunner, LLP

(57) ABSTRACT

A method of controlling engine NOx production is provided. The method may include determining a desired amount of NOx production for at least one engine cylinder at a first time and determining at least one engine operating parameter to produce the desired amount of NOx using a feed-forward neural network.

16 Claims, 5 Drawing Sheets

NOX CONTROL USING A NEURAL NETWORK

TECHNICAL FIELD

This disclosure pertains to control of engine NOx production, and more particularly, to control of NOx production using a neural network.

BACKGROUND

Engine exhaust emissions are becoming increasingly important for engine manufacturers. Governments and regulatory agencies are enforcing ever more stringent emissions standards for many types of highway and off-highway vehicles, and manufacturers must develop new technologies to meet these standards while providing high-performance, cost-effective equipment to consumers.

One significant exhaust gas pollutant includes nitric oxides (NOx). Engine manufacturers use a variety of different technologies to decrease NOx emissions including new engine designs that produce low levels of NOx during combustion and exhaust system technologies that remove NOx from exhaust gases before release to the environment. One technology for removing NOx from engine exhaust is selective catalytic reduction (SCR). SCR works by causing NOx to react with a reductant (e.g. ammonia) to produce environmentally friendly products, such as nitrogen gas and water.

SCR presents its own challenges. For example, SCR requires a reductant, which must be carried in an on-board tank or produced during machine operation. However, supply of a reductant through an on-board source requires periodic replenishment, which can be inconvenient and expensive. In addition on-board production may be complicated by difficulties in appropriately matching reductant and NOx levels or by an inability to produce enough reductant. Regardless of how the reductant is provided, it is desirable to control the amount of NOx produced by the engine to appropriately match reductant and NOx levels at a downstream SCR catalyst.

One NOx emission control system is described in U.S. Pat. No. 6,882,929, which issued to Liang et al. on Apr. 19, 2005 (hereinafter the '929 patent). The method of the '929 patent includes determining predicted NOx levels based on a model reflecting a relationship between NOx levels and a number of control parameters. The method may further include reducing engine NOx production based on the model.

Although the method of the '929 patent may allow reduction in engine NOx production, the method of the '929 patent may not provide suitable control of NOx levels for SCR. For example, while the method of the '929 patent may provide a feedback mechanism for reducing NOx production, it may not allow rapid adjustment of NOx within a desirable range so that NOx and reductant levels may be matched appropriately at a downstream catalyst.

The present disclosure is directed at overcoming the shortcomings of the prior art NOx emissions-control systems.

SUMMARY OF THE INVENTION

A first aspect of the present disclosure includes a method of controlling engine NOx production. The method may include determining a desired amount of NOx production for at least one engine cylinder at a first time and determining at least one engine operating parameter to produce the desired amount of NOx using a feed-forward neural network.

A second aspect of the present disclosure includes an engine emissions control system. The control system may include an engine including one or more cylinders configured to produce a NOx-containing exhaust gas. The system may further include an engine control module including a feed-forward neural network configured to determine at least one operating parameter of the one or more engine cylinders based on a desired NOx production level at a first time.

A third aspect of the present disclosure includes a NOx emissions control system. The system may include a first cylinder group configured to produce a first NOx-containing exhaust gas and a second cylinder group configured to produce a second NOx-containing exhaust gas. An ammonia producing catalyst may be disposed downstream of the second cylinder group. An engine control module including a neural network may be configured to determine at least one operating parameter for the first cylinder group based on a desired NOx production level of the first cylinder group at a first time.

DETAILED DESCRIPTION

Figure 1:
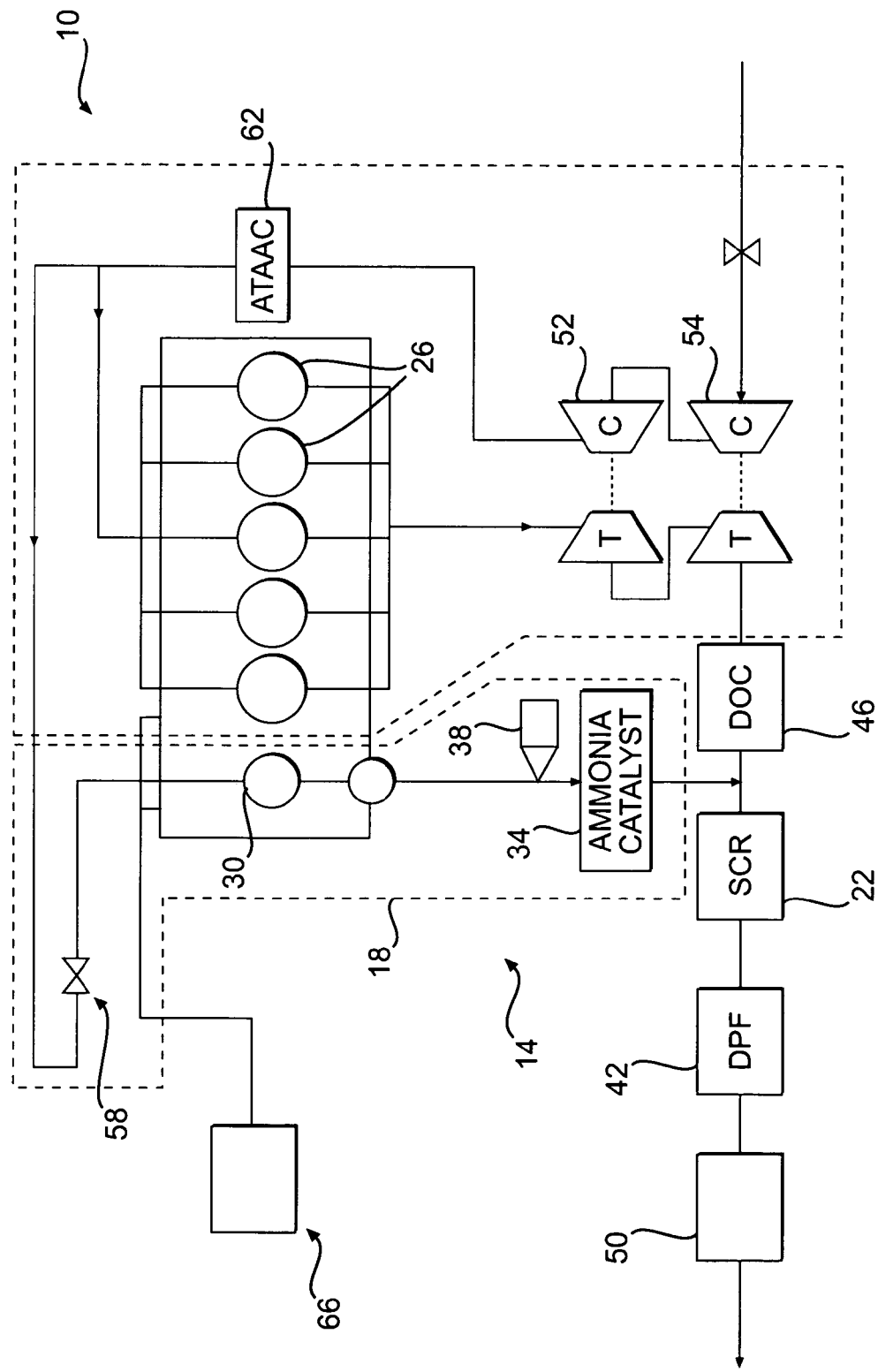
FIG. 1 illustrates a diagrammatic representation of a machine, including a NOx-emissions control system, according to an exemplary disclosed embodiment.

FIG. 1 illustrates a diagrammatic representation of a machine 10, including a NOx-emissions control system 14, according to an exemplary disclosed embodiment. As shown, NO-emissions control system 14 includes a reductant source 18, and a selective catalytic reduction (SCR) catalyst 22. SCR catalyst 22 may be disposed downstream of reductant source 18 in a machine exhaust system. Further, one or more NOx-producing engine cylinders 26 may be disposed downstream of reductant source 18 in a machine exhaust system. SCR catalyst 22 may be configured to catalyze a reaction between a reductant (e.g. ammonia) produced by reductant source 18 and NOx contained in an exhaust gas stream produced by combustion in cylinders 26.

As shown, reductant source 18 includes an engine cylinder 30 disposed upstream of an ammonia-producing catalyst 34. Engine cylinder 30 may be configured to produce a NOx-containing exhaust gas stream, and the NOx-containing exhaust gas stream may be passed over ammonia-producing catalyst 34 to convert at least a portion of the NOx into ammonia. The ammonia may be mixed with the NOx-containing exhaust gas stream produced by cylinders 26 to facilitate NOx reduction at SCR catalyst 22.

As shown, reductant source 18 includes single cylinder 30 configured to produce NOx for ammonia generation. However, cylinder 30 may include multiple engine cylinders such that machine 10 includes a first cylinder group comprising cylinders 26 and a second cylinder group comprising cylinders 30. Further, the number of cylinders in each cylinder group may be selected based on the amount of ammonia desired or the power output required to operate machine 10. Further, as shown, cylinder 30 is included on the same engine block as cylinders 26. In some embodiments, cylinder 30 may be included on a separate engine. In still other embodiments, cylinder 30 may be replaced by a burner, which may be configured to burn diesel fuel or gasoline to produce NOx without supplying power to a drive shaft of machine 10.

Reductant source 18 may further include additional catalysts, filters, or exhaust additive supply systems. For example, reductant source 18 may include a fuel supply device 38 upstream of ammonia-producing catalyst 34. Fuel supply device 38 may supply fuel to the NOx-containing exhaust gas stream produced by cylinder 30, thereby enriching the exhaust gas stream to facilitate production of ammonia at ammonia-producing catalyst 34. In other embodiments, reductant source 18 may include additional catalysts configured to control the composition of the exhaust gas stream flowing into ammonia-producing catalyst 34 to improve ammonia production at catalyst 34.

As shown, machine 10 may include a variety of additional exhaust system and/or engine components. These components may be selected to control emissions from machine 10, to control the power output from cylinders 26, 30, to control the amount of ammonia produced by reductant source 18, and/or to control the amount of NOx produced by cylinders 30. For example, in some embodiments, machine 10 may include one or more diesel particulate filters 42 or diesel oxidation catalysts 46, and/or any other suitable catalyst 50, filter, or exhaust flow control system.

Machine 10 may further include systems for controlling the flow of air into cylinders 26, 30. For example, in some embodiments, machine 10 may include one or more turbochargers 52, 54 configured to increase the flow of air into cylinders 26 and/or cylinder 30. As shown, turbochargers 52, 54 may be fluidly connected with air-intake passages of both cylinders 26 and cylinder 30. Further, a throttle 58 or other air flow control system may be configured to control the flow of air into cylinder 30. In other embodiments, the air-intake of cylinder 30 may be fluidly isolated from the air-intake of cylinders 26, thereby allowing independent control of the air-fuel ratios within cylinders 26 and cylinder 30. Further, cylinder 30 may be operably connected with a separate turbocharger (not shown) to allow rapid control of the air-fuel ratio within cylinder 30.

In addition, machine 10 may further include a variety of suitable air-temperature or air-quality control components. For example, as shown, machine 10 may include an air-to-air after cooler 62 or other suitable system for controlling the temperature or composition of air flowing into cylinders 26, 30. Any suitable system may be selected to control engine emissions, improve fuel efficiency, or control machine power output.

To provide suitable NOx reduction at SCR catalyst 22, it may be desirable to control the relative amounts of reductant and NOx flowing into SCR catalyst 22. For example, in some embodiments, it may be desirable to maintain the amount of ammonia and NOx flowing into SCR catalyst 22 at approximately a stoichiometric ratio. In other embodiments, depending on catalyst temperature, exhaust gas composition, desired machine power output, and/or any other suitable factor, the ammonia-to-NOx ratio flowing into SCR catalyst 22 may be maintained at less than or greater than stoichiometric levels. The specific ammonia-to-NOx ratio may be selected to optimize NOx reduction while preventing ammonia slip.

In some embodiments, machine 10 may include an electronic control unit 66 (ECU). ECU 66 may be configured to control operational parameters of cylinders 26, 30 to control the amount of NOx and reductant produced by cylinders 26 and reductant source 18. ECU 66 may include a variety of configurations. For example, ECU 66 may include a microprocessor, RAM, and/or ROM. Further ECU 66 may communicate with a variety of machine sensors and/or control systems, such as NOx sensors, temperature sensors, turbochargers, fuel injectors, and/or any other machine component that may provide information related to machine operational characteristics and/or affect machine performance. In some embodiments, as described in detail below, ECU 66 may include a feed-forward neural network configured to control the amount of NOx produced by cylinders 26.

Figure 2:
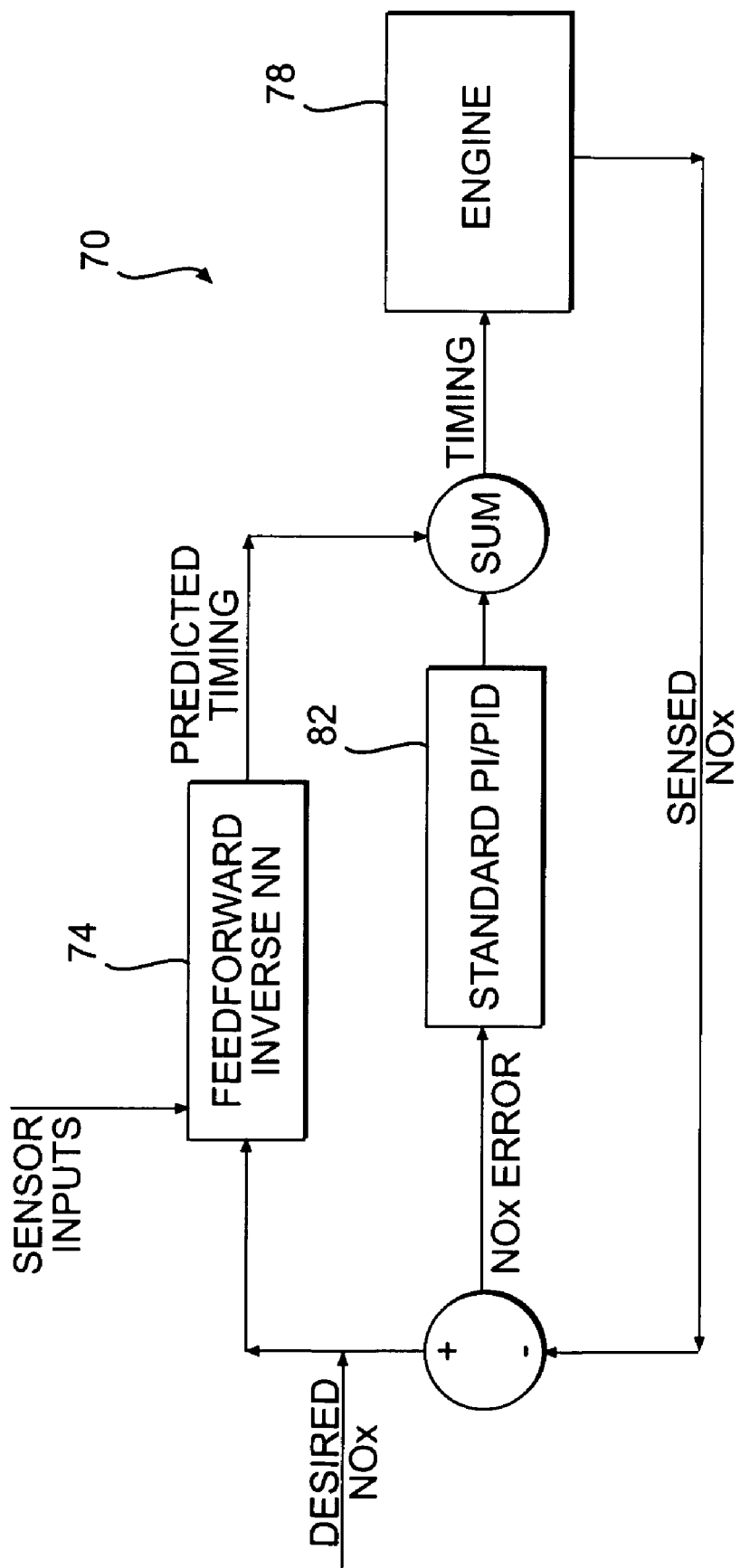
FIG. 2 illustrates a block diagram for a control system, according to an exemplary disclosed embodiment.

FIG. 2 illustrates a block diagram for a machine control system 70, according to an exemplary disclosed embodiment. As shown control system 70 includes a feed-forward inverse neural network 74, as may be stored in and operated by ECU 66. Neural network 74 may receive or determine a desired NOx output for cylinders 26. Further, neural network 74 may receive information related to machine and/or engine operating parameters from various machine sensors (e.g. NOx sensors, temperature sensors, pressure sensors). Based on the desired NOx output and sensor inputs, neural network 74 may calculate a machine operational parameter needed for production of the desired NOx level from combustion within an engine 78. In one embodiment, the operational parameter may include an engine injection timing. Neural network 74 may transmit this desired injection timing to engine 78 to effect production of a desired NOx level.

In some embodiments, control system 70 may further include additional control components that may function in concert with or as an alternative to neural network 74. For example, in some embodiments, control system 70 may include one or more proportional-integral-derivative controllers (PI/PID) 82. Such controllers may provide feedback control based on sensed NOx production from engine 78. Information derived from controllers 82 may be further integrated with a predicted timing provided by neural network 74 to further improve control of NOx levels.

In some embodiments, the desired NOx level may be determined based on a predicted or measured ammonia concentration at SCR catalyst 22, as shown in FIG. 1. For example, in one embodiment, reductant source 18 may be configured to produce a substantially constant level of ammonia, and the NOx level produced by cylinders 26 may be selected to maintain the ammonia-to-NOx ratio at SCR catalyst 22 within a desired range. Further, the operation of cylinders 26 may be controlled to provide a desired machine power output while also producing a desired NOx level.

Further, there may be a difference in the exhaust system transit time from ammonia-producing catalyst 34 to SCR catalyst 22 and the exhaust system transit time from cylinders 26 to SCR catalyst 22. Therefore, in order to account for the transit time difference of a reductant produced by reductant source 18 and NOx produced by cylinders 26, the desired NOx level at a first time ($T_1$) may be determined based on an ammonia production level at ammonia-producing catalyst 34 at a second time ($T_2$). Further, in some embodiments, the transit time from ammonia-producing catalyst 34 to SCR catalyst 22 will be shorter than the transit time from cylinders 26 to SCR catalyst 22, and therefore, the second time ($T_2$) will occur before the first time, thereby accounting for the exhaust system transit time difference.

Figure 3:
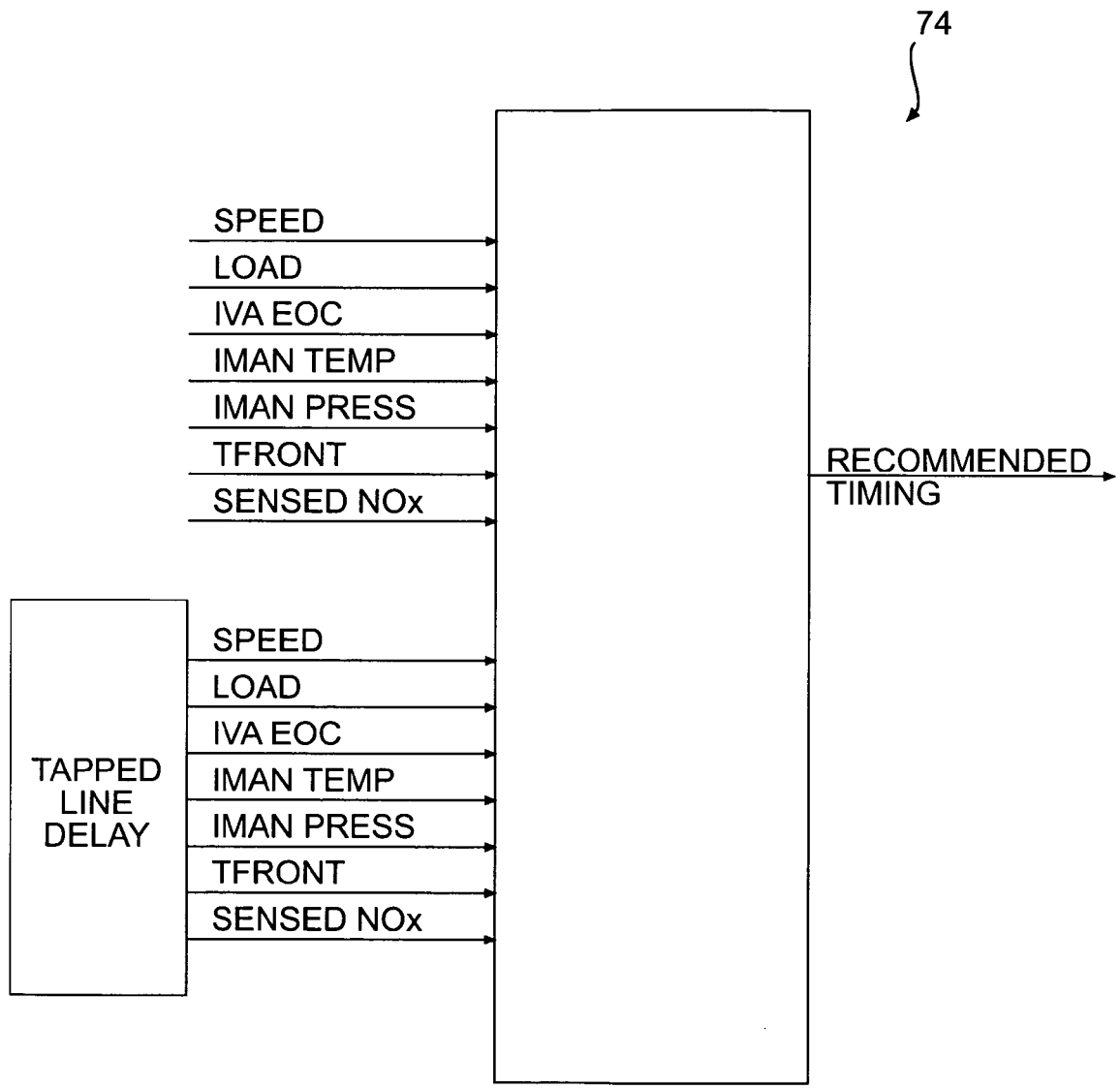
FIG. 3 illustrates an exemplary feed-forward neural network that may be included in the control system of FIG. 2.

FIG. 3 illustrates a more detailed view of an exemplary feed-forward neural network 74 that may be included in the control system of FIG. 2. Generally, neural network 74 may be configured to receive a number of sensor inputs related to machine operational characteristics and to calculate a desired injection timing selected to produce a desired NOx concentration given the sensor inputs. As shown, the inputs may include an engine speed, an engine load, a fuel consumption rate, an injection timing, an injection pressure (Tfront), an intake manifold pressure (Iman Press), an intake manifold temperature (Iman Temp), an injection valve actuation (IVA), and a sensed NOx level. The neural network may output a recommended injection timing value to obtain the desired NOx emissions.

During transient engine operation (e.g. during periods of changing power output and/or speed), the NOx produced at a particular instant in time may be dependent not only on the operating conditions of the engine at that point, but also on the operating conditions of the engine in the recent past (e.g. within the last 0-2 seconds). Therefore, to account for changing operational parameters that may affect NOx production, and consequently the recommended injection timing, the input and the output may be recorded at a past time and fed back into the neural network as additional inputs, as indicated in FIG. 3 as 'Tapped line delay'. This is done in order to incorporate time history into the system.

Figure 4:
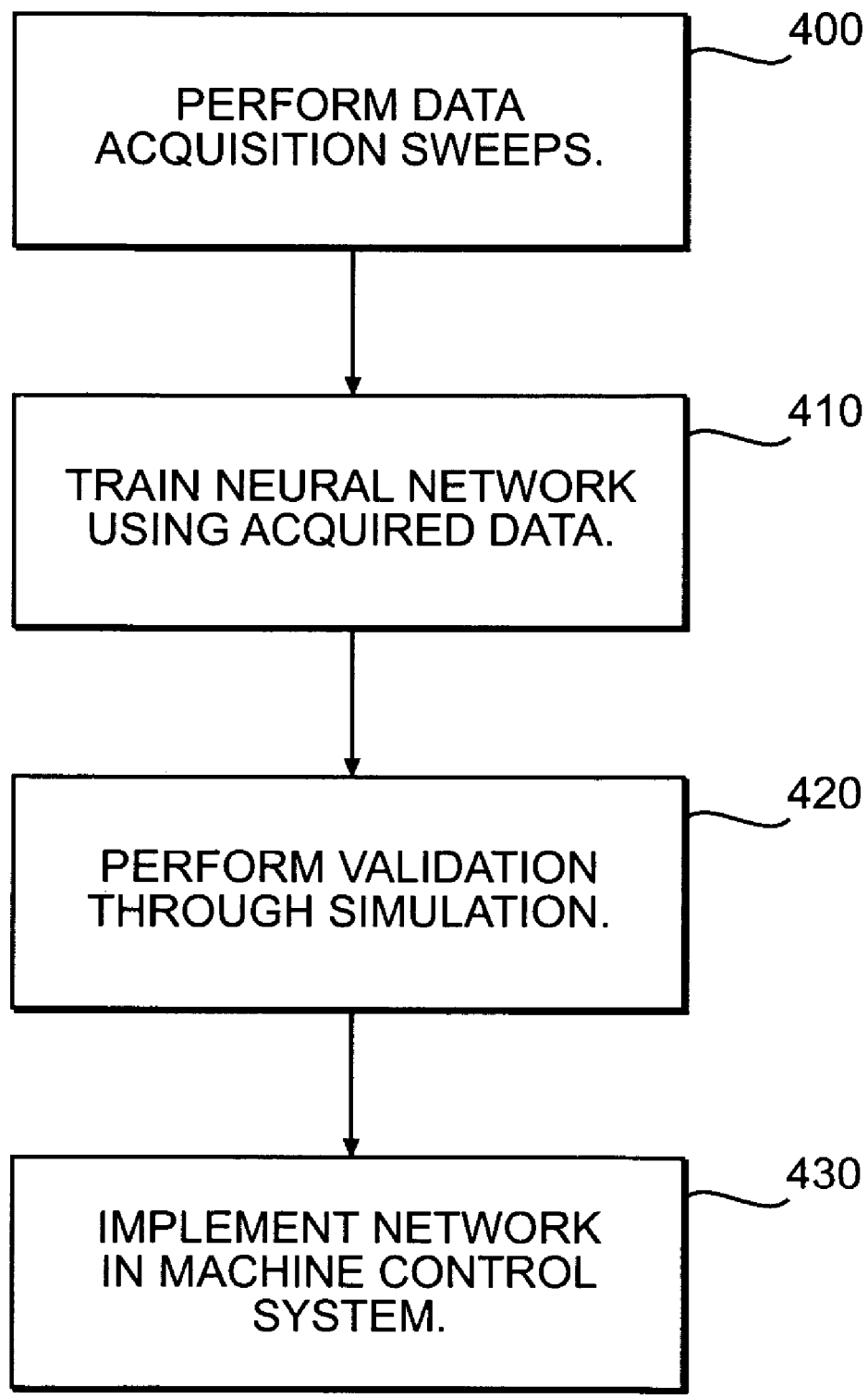
FIG. 4 illustrates steps for implementing a neural network for NOx control, according to an exemplary disclosed embodiment.

FIG. 4 illustrates steps for implementing a neural network for NOx control, according to an exemplary disclosed embodiment. For NOx control using the disclosed neural network, it is first necessary to acquire data from the engine and exhaust system selected for machine 10, as shown at Step 400. Data acquisition can be performed by sweeping engine operating parameters for both steady state and transient engine operation, and recording operational parameters and NOx production levels during the sweeps. Generally, it may be necessary to perform more operational sweeps to obtain operational data for transient engine operation than for steady state engine operation.

Next, a neural network may be trained using the data acquired through the operational sweeps, as shown at 410. Data acquired from Step 400 may be used to train the neural network with selected injection timing values predicted from the operational sweeps. The data points may be selected at predetermined time intervals throughout the data sweeps. Generally, data points may be selected at every 0.1 seconds to 0.6 seconds. The specific number of data points and time intervals may be selected based on the specific engine and exhaust system selected and/or predicted based on operating conditions of machine 10.

Subsequently, simulation runs may be performed to validate the neural network performance, as shown at Step 420. Simulation runs are performed by selecting desired NOx outputs and determining a predicted timing using the neural network, as trained at Step 410. In addition, time lag studies may be performed to correlate previous operating parameters with current NOx output.

Finally, the network may be loaded into the machine control unit for implementation of the network for NOx-production control, as shown at 430. The final inputs for use with the neural network are determined by finding a suitable correlation between desired NOx and injection timing, as determined during simulation runs performed at Step 420. The neural network may then be used to provide feed-forward control of NOx production using injection timing or other operating parameters for cylinders 26.

It should be noted that neural network 74 may be used with a variety of different engine and SCR configurations. For example, as described previously, neural network 72 may be used to control engine NOx production in conjunction with an on-board ammonia production system. In other embodiments, neural network 72 may be used to control engine NOx production without on-board ammonia production.

Figure 5:
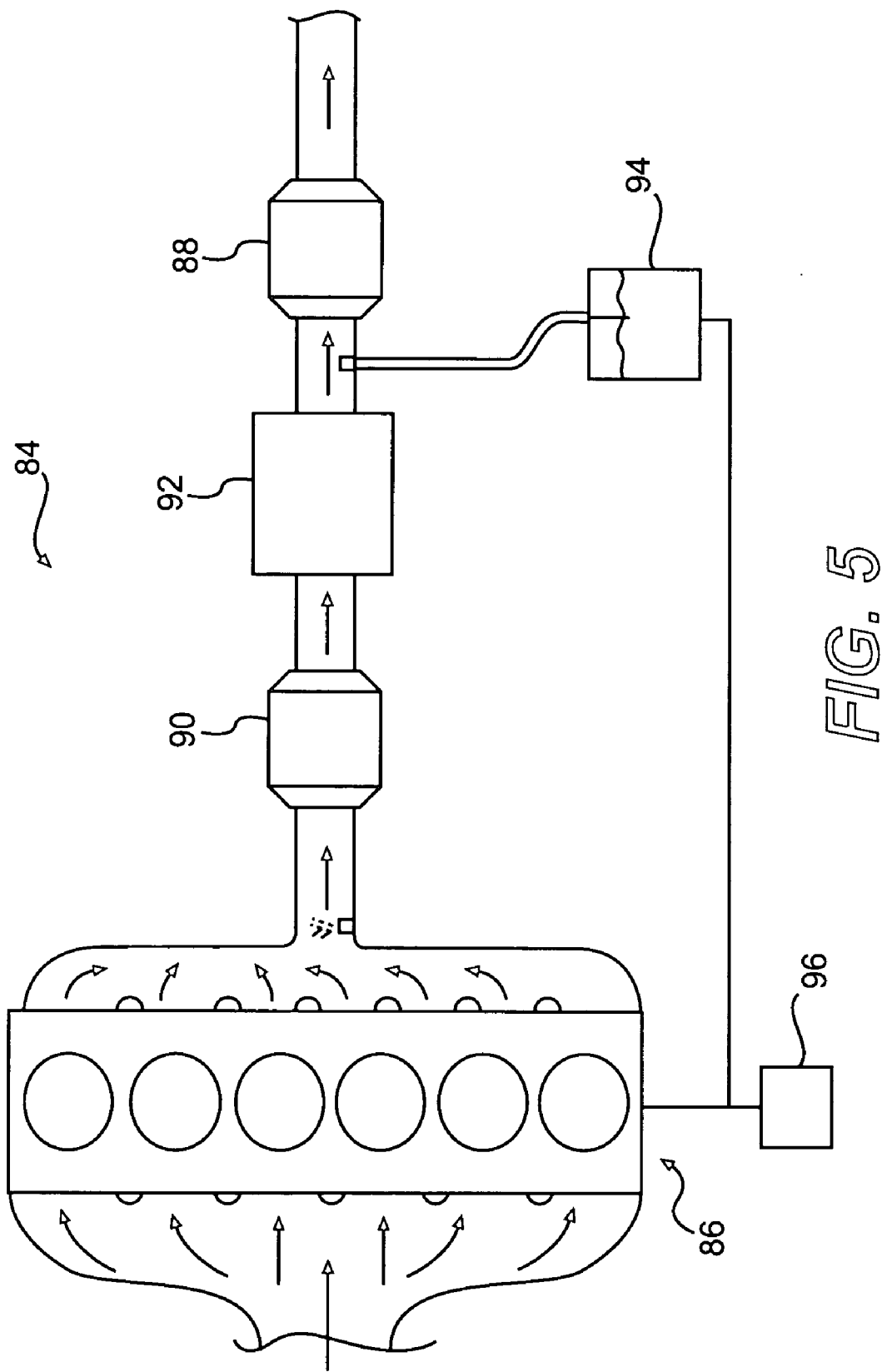
FIG. 5 illustrates a diagrammatic representation of a machine, including a NOx-emissions control system, according to another exemplary disclosed embodiment.

FIG. 5 illustrates a diagrammatic representation of a machine, including a NOx-emissions control system 84, according to another exemplary disclosed embodiment. Emissions control system 84 includes an engine 86. Engine 86 may include any conventional engine design. For example, as shown engine 86 includes an in-line six cylinder engine. However, any suitable engine configuration or number of cylinders may be selected. Further, as shown, none of the cylinders of engine 86 are configured for on-board ammonia production using a down-stream, ammonia-producing catalyst, such as ammonia-producing catalyst 34.

NOx-emissions control system 84 may further include a down stream SCR catalyst 88, and one or more additional catalysts 90, 92 configured to control machine exhaust emissions. Further, as shown, control system 84 may include a urea supply system 94 configured to supply urea upstream of SCR catalyst 88. The urea may be at least partially converted into ammonia within an exhaust gas stream produced by engine 86. The ammonia will react with NOx in the engine exhaust gas stream at SCR catalyst 88 to produce water and nitrogen gas, thereby reducing machine exhaust emissions.

Further, NOx-emissions control system 84 may include a control unit 96. Control unit 96 may include a feed-forward neural network 74 and or other control system components, as described with reference to FIG. 2. Control unit 96 may be configured to control engine operation to effect a desired NOx production level. In addition, control unit 96 may control the amount of urea supplied by urea supply system 94 to provide a desired ratio of ammonia and NOx flowing into SCR catalyst 88. In some embodiments, control unit 96 may include a feed-forward neural network to control engine NOx production based on one or more current or previously-recorded engine operating parameters, as described previously.

INDUSTRIAL APPLICABILITY

The present disclosure provides a system and method for controlling engine NOx emissions. The system and method may be used in any machine that requires accurate control of NOx production, including on-highway trucks.

The method of the present disclosure includes a neural network adapted to control engine NOx emissions. The neural network may include an inverse feed-forward network, which may specify one or more engine operating parameters required to produce a desired NOx level. In some embodiments, the neural network may specify an engine injection timing based on a variety of different engine operating parameters, including for example, an injection valve actuation, an intake manifold temperature, an intake manifold pressure, an engine speed, an engine load, a fuel consumption, a NOx sensor reading, and an injection pressure.

In addition, the neural network of the present disclosure may be configured to determine a desired injection timing based not only on current operating parameters, but on operating parameters at predetermined past times. During transient engine operation (i.e. during changing engine demands such as power output, speed, etc.) engine NOx production may be affected not only by current operating conditions, but also by operating parameters in the recent past. Therefore, the neural network of the present disclosure, by taking into account both current and recently past operating parameters, may accurately and precisely control NOx production during both steady-state and transient engine operation.

Further, the system and method of the present disclosure may provide rapid and accurate control of NOx production for SCR. Because the system may include a feed-forward design, the system may quickly adjust NOx production to a desired level, thereby overcoming difficulties in matching downstream NOx and ammonia levels due to time lags inherent in feed-back control systems. Further, the neural network may be periodically retrained to account for changes in machine operation due to aging, environmental change, advances in fuel technologies, and/or any other parameters.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A method of controlling engine NOx production, comprising:
   producing a first exhaust stream containing NOx from a first cylinder group;
   producing ammonia in an ammonia production source to react with the NOx in the first exhaust stream in a catalyst;
   determining a desired amount of NOx production from the first cylinder group based on the amount of ammonia produced by the ammonia production source; and
   determining at least one engine operating parameter to produce the desired amount of NOx using a feed-forward neural network, wherein the neural network determines the at least one engine operating parameter based on values of multiple engine operational characteristics at a current time and an earlier time.

2. The method of claim 1, wherein the at least one engine operating parameter is an approximate injection timing.

3. The method of claim 1, wherein the producing ammonia in an ammonia production source includes converting NOx in a second exhaust stream of a second cylinder group to ammonia.

4. The method of claim 1, wherein the multiple engine operational characteristics include at least three of an engine speed, an engine load, an engine fuel consumption, an intake manifold pressure, an intake manifold temperature, an injection valve actuation, a NOx sensor reading, and an injection pressure.

5. An engine emissions control system, comprising:
   an engine including one or more cylinders configured to produce a first NOx-containing exhaust gas;
   an ammonia production system configured to produce ammonia to react with NOx in the first NOx containing exhaust gas in a catalyst;
   sensors configured to provide operational characteristics of the engine to an engine control module;
   the engine control module including a feed-forward neural network configured to determine at least one engine operating parameter for the one or more engine cylinders based on the amount of ammonia produced by the ammonia production source and multiple operational characteristics of the engine including at least injection timing, injection pressure, and intake manifold pressure.

6. The emissions control system of claim 5, wherein the at least one engine operating parameter is an approximate injection timing.

7. The emissions control system of claim 5, wherein the ammonia production source includes a catalyst configured to convert NOx in a second NOx containing exhaust gas to ammonia.

8. The emissions control system of claim 5, wherein the at least one engine operating parameter is determined further based on at least one of an engine speed, an engine load, an engine fuel consumption, an intake manifold temperature, and a NOx sensor reading.

9. The emissions control system of claim 8, wherein the at least one engine operating parameter is further based on at least one previously-recorded operational characteristics of the engine.

10. The method of claim 3, wherein the first cylinder group and the second cylinder group are located on separate engines.

11. The method of claim 1, further including using output from one or more proportional-integral-derivative (PID) controllers in addition to the values of multiple engine operational characteristics to determine the at least one engine operating parameter.

12. The method of claim 1, wherein the determination of the at least one engine operating parameter is further based on a difference in gas transit times of the produced ammonia and the first exhaust stream to the catalyst.

13. The method of claim 1, wherein the ammonia production source includes a urea supply system.

14. The emission control system of claim 7, wherein the first NOx containing exhaust gas and the second NOx containing exhaust gas are produced by separate engines.

15. The emission control system of claim 5, wherein the ammonia production source includes a urea supply system.

16. The emission control system of claim 9, wherein the at least one previously-recorded operational characteristics of the engine include at least injection timing, injection pressure, and intake manifold pressure recorded at an earlier time.

* * * * *